(12) United States Patent
Shah et al.

(10) Patent No.: US 12,106,151 B2
(45) Date of Patent: Oct. 1, 2024

(54) DYNAMIC CLIENT/SERVER SELECTION FOR MACHINE LEARNING EXECUTION BASED ON CURRENT PERFORMANCE CHARACTERISTICS

(71) Applicant: LENOVO (Singapore) PTE. LTD., New Tech Park (SG)

(72) Inventors: Saba Shah, Morrisville, NC (US); Xiaohua Xu, Raleigh, NC (US); Rod D. Waltermann, Rougemont, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 744 days.

(21) Appl. No.: 17/157,896

(22) Filed: Jan. 25, 2021

(65) Prior Publication Data
US 2022/0237044 A1 Jul. 28, 2022

(51) Int. Cl.
*G06F 9/50* (2006.01)
*G06F 11/30* (2006.01)
*G06F 11/34* (2006.01)
*G06N 20/00* (2019.01)

(52) U.S. Cl.
CPC .......... *G06F 9/5038* (2013.01); *G06F 9/5044* (2013.01); *G06F 9/505* (2013.01); *G06F 11/3409* (2013.01); *G06F 11/3433* (2013.01); *G06N 20/00* (2019.01); *G06F 11/3003* (2013.01); *G06F 2209/501* (2013.01); *G06F 2209/509* (2013.01)

(58) Field of Classification Search
None
See application file for complete search history.

(56) References Cited

U.S. PATENT DOCUMENTS

| 6,938,256 | B2* | 8/2005 | Deng | H04L 67/1021 |
| | | | | 718/104 |
| 9,979,780 | B1* | 5/2018 | Faibish | H04L 67/1097 |
| 10,176,435 | B1* | 1/2019 | Sarkar | G06N 20/00 |
| 10,481,629 | B2* | 11/2019 | Goparaju | G06N 5/045 |
| 11,426,656 | B2* | 8/2022 | van der Laan | H04N 21/6587 |
| 11,537,439 | B1* | 12/2022 | Liberty | G06F 9/5077 |
| 2011/0320520 | A1* | 12/2011 | Jain | G06F 9/5072 |
| | | | | 709/224 |
| 2014/0229673 | A1* | 8/2014 | Colgrove | G06F 11/1076 |
| | | | | 711/114 |
| 2015/0046927 | A1* | 2/2015 | Rodbro | G06F 9/50 |
| | | | | 718/104 |

(Continued)

*Primary Examiner* — Abu Zar Ghaffari
(74) *Attorney, Agent, or Firm* — Kunzler Bean & Adamson; Bruce R. Needham

(57) ABSTRACT

An apparatus includes a processor and a memory that stores code executable by the processor. The code is executable by the processor to receive a request at a first device to execute a machine learning workload for the first device, dynamically determine at least one characteristic of the first device that is related to execution of the machine learning workload, dynamically determine at least one characteristic of a second device that is related to execution of the machine learning workload, and select one of the first and second devices to execute the machine learning workload in response to the at least one characteristic of the selected one of the first and second devices being more suitable for execution of the machine learning workload than another of the first and second devices.

14 Claims, 5 Drawing Sheets

(56) References Cited

U.S. PATENT DOCUMENTS

| | | | | |
|---|---|---|---|---|
| 2017/0277994 | A1* | 9/2017 | Sharifi | H04L 67/10 |
| 2018/0189674 | A1* | 7/2018 | Hillard | G06N 20/00 |
| 2019/0146424 | A1* | 5/2019 | Buda | G06F 9/46 |
| | | | | 700/28 |
| 2019/0303196 | A1* | 10/2019 | Song | G05B 19/41865 |
| 2020/0117508 | A1* | 4/2020 | Subramanian | G06F 40/279 |
| 2020/0233707 | A1* | 7/2020 | Ramamurthy | G06F 9/5066 |
| 2020/0348977 | A1* | 11/2020 | Yi | G06F 3/067 |
| 2021/0224665 | A1* | 7/2021 | Cheng | G06F 9/5027 |
| 2021/0240550 | A1* | 8/2021 | Hinrichs | G06F 9/546 |

* cited by examiner

DYNAMIC CLIENT/SERVER SELECTION FOR MACHINE LEARNING EXECUTION BASED ON CURRENT PERFORMANCE CHARACTERISTICS

FIELD

The subject matter disclosed herein relates to machine learning execution and more particularly relates to dynamic client/server selection for machine learning execution.

BACKGROUND

Some devices are better suited for executing certain programs, applications, algorithms, and/or the like. Machine learning processes may require a certain amount of resources to execute efficiently. In a client-server model, machine learning processes may be executed on either the client or the server, or some combination of both.

BRIEF SUMMARY

Apparatuses, methods, systems, and program products are disclosed for dynamic client/server selection for machine learning execution. An apparatus, in one embodiment, includes a processor and a memory that stores code executable by the processor. In certain embodiments, the code is executable by the processor to receive a request at a first device to execute a machine learning workload for the first device. In some embodiments, the code is executable by the processor to dynamically determine at least one characteristic of the first device that is related to execution of the machine learning workload. In further embodiments, the code is executable by the processor to dynamically determine at least one characteristic of a second device that is related to execution of the machine learning workload. The second device may be communicatively coupled to the first device. In various embodiments, the code is executable by the processor to select one of the first and second devices to execute the machine learning workload in response to the at least one characteristic of the selected one of the first and second devices being more suitable for execution of the machine learning workload than another of the first and second devices.

A method for dynamic client/server selection for machine learning execution, in one embodiment, includes receiving, by a processor, a request at a first device to execute a machine learning workload for the first device. The method, in further embodiments, includes dynamically determining at least one characteristic of the first device that is related to execution of the machine learning workload. In certain embodiments, the method includes dynamically determining at least one characteristic of a second device that is related to execution of the machine learning workload. The second device may be communicatively coupled to the first device. In one embodiment, the method includes selecting one of the first and second devices to execute the machine learning workload in response to the at least one characteristic of the selected one of the first and second devices being more suitable for execution of the machine learning workload than the other one of the first and second devices.

A computer program product for dynamic client/server selection for machine learning execution, in one embodiment, includes a computer readable storage medium having program instructions embodied therewith. In certain embodiments, the program instructions are executable by a processor to cause the processor to receive a request at a first device to execute a machine learning workload for the first device. In some embodiments, the program instructions are executable by a processor to cause the processor to dynamically determine at least one characteristic of the first device that is related to execution of the machine learning workload. In further embodiments, the program instructions are executable by a processor to cause the processor to dynamically determine at least one characteristic of a second device that is related to execution of the machine learning workload. In some embodiments, the second device is communicatively coupled to the first device. In one embodiment, the program instructions are executable by a processor to cause the processor to select one of the first and second devices to execute the machine learning workload in response to the at least one characteristic of the selected one of the first and second devices being more suitable for execution of the machine learning workload than the other one of the first and second devices.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
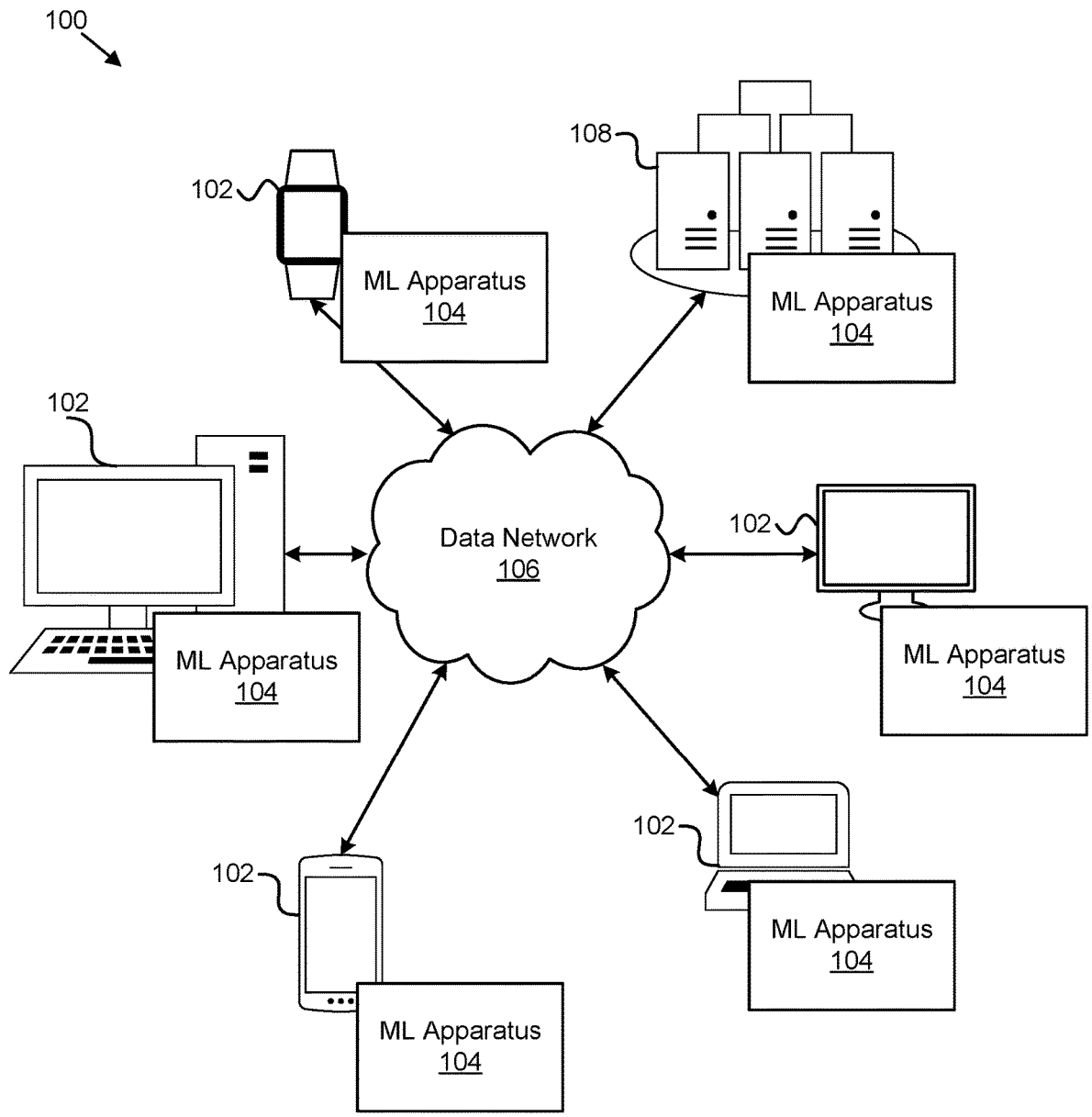
FIG. 1 is a schematic block diagram illustrating one embodiment of a system for dynamic client/server selection for machine learning execution.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes a processor and a memory that stores code executable by the processor. In certain embodiments, the code is executable by the processor to receive a request at a first device to execute a machine learning workload for the first device. In some embodiments, the code is executable by the processor to dynamically determine at least one characteristic of the first device that is related to execution of the machine learning workload. In further embodiments, the code is executable by the processor to dynamically determine at least one characteristic of a second device that is related to execution of the machine learning workload. The second device may be communicatively coupled to the first device. In various embodiments, the code is executable by the processor to select one of the first and second devices to execute the machine learning workload in response to the at least one characteristic of the selected one of the first and second devices being more suitable for execution of the machine learning workload than another of the first and second devices.

In one embodiment, the at least one characteristic of the first device comprises a wait time for executing the machine learning workload on the first device, the first device selected for executing the machine learning workload in response to the first device providing a result of executing the machine learning workload in real-time.

In one embodiment, the at least one characteristic of a second device comprises a wait time for executing the machine learning workload on the second device, the second device selected for executing the machine learning workload in response to the first device not capable of returning a real-time response and in response to the wait time being less than a requested time for receiving a response.

In one embodiment, the code is executable by the processor to select a different second device that is communicatively coupled to the first device in response to the second device having a wait time that exceeds the requested time for receiving a response and in response to the different second device being capable of returning a response within the requested time for receiving a response.

In one embodiment, the code is executable by the processor to select one of the first device, the second device, and the different second device that has the lowest wait time for returning a response in response to the different second device having a wait time that exceeds the requested time for receiving a response.

In one embodiment, the at least one characteristic of the first device comprises at least one of a processor usage, a memory usage, and a remaining battery life of the first device. The first device may be selected to execute the machine learning workload in response to one or more of the characteristics of the first device satisfying at least one condition of the machine learning workload.

In one embodiment, the at least one condition of the machine learning workload is determined based on historical trend data for previous executions of the machine learning workload. In certain embodiments, the historical trend data describes an estimated amount of computing resources used to execute the machine learning workload on the first device.

In one embodiment, in response to the first device not being selected to execute the machine learning workload, the code is executable by the processor to compute a mean workload for the machine learning workload based on the historical trend data for the machine learning workload and a load balancer for each of a plurality of second devices. A second of the plurality of second devices may be selected to execute the machine learning workload in response the second being capable of handling the mean workload for the machine learning workload plus one standard deviation.

In one embodiment, the code is executable by the processor to periodically poll the second device for information related to the characteristics of the second device. In some embodiments, the first device comprises an Internet of Things device.

A method for dynamic client/server selection for machine learning execution, in one embodiment, includes receiving, by a processor, a request at a first device to execute a machine learning workload for the first device. The method, in further embodiments, includes dynamically determining at least one characteristic of the first device that is related to execution of the machine learning workload. In certain embodiments, the method includes dynamically determining at least one characteristic of a second device that is related to execution of the machine learning workload. The second device may be communicatively coupled to the first device. In one embodiment, the method includes selecting one of the first and second devices to execute the machine learning workload in response to the at least one characteristic of the selected one of the first and second devices being more suitable for execution of the machine learning workload than the other one of the first and second devices.

In one embodiment, the at least one characteristic of the first device comprises a wait time for executing the machine learning workload on the first device, the first device selected for executing the machine learning workload in response to the first device providing a result of executing the machine learning workload in real-time.

In some embodiments, the at least one characteristic of a second device comprises a wait time for executing the machine learning workload on the second device. The second device may be selected for executing the machine learning workload in response to the first device not capable of returning a real-time response and in response to the wait time being less than a requested time for receiving a response.

In one embodiment, the method includes selecting a different second device that is communicatively coupled to the first device in response to the second device having a wait time that exceeds the requested time for receiving a response and in response to the different second device being capable of returning a response within the requested time for receiving a response.

In one embodiment, the method includes selecting one of the first device, the second device, and the different second device that has the lowest wait time for returning a response in response to the different second device having a wait time that exceeds the requested time for receiving a response.

In one embodiment, the at least one characteristic of the first device comprises at least one of a processor usage, a memory usage, and a remaining battery life of the first device. The first device may be selected to execute the machine learning workload in response to one or more of the characteristics of the first device satisfying at least one condition of the machine learning workload.

In one embodiment, the at least one condition of the machine learning workload is determined based on historical trend data for previous executions of the machine learning workload. The historical trend data may describe an estimated amount of computing resources used to execute the machine learning workload on the first device.

In one embodiment, in response to the first device not being selected to execute the machine learning workload, the method includes computing a mean workload for the machine learning workload based on the historical trend data for the machine learning workload and a load balancer for each of a plurality of second devices. A second of the plurality of second devices may be selected to execute the machine learning workload in response the second being capable of handling the mean workload for the machine learning workload plus one standard deviation.

A computer program product for dynamic client/server selection for machine learning execution, in one embodiment, includes a computer readable storage medium having program instructions embodied therewith. In certain embodiments, the program instructions are executable by a processor to cause the processor to receive a request at a first device to execute a machine learning workload for the first device. In some embodiments, the program instructions are executable by a processor to cause the processor to dynamically determine at least one characteristic of the first device that is related to execution of the machine learning workload. In further embodiments, the program instructions are executable by a processor to cause the processor to dynamically determine at least one characteristic of a second device that is related to execution of the machine learning workload. In some embodiments, the second device is communicatively coupled to the first device. In one embodiment, the program instructions are executable by a processor to cause the processor to select one of the first and second devices to execute the machine learning workload in response to the at least one characteristic of the selected one of the first and second devices being more suitable for execution of the machine learning workload than the other one of the first and second devices.

FIG. 1 is a schematic block diagram illustrating one embodiment of a system 100 for dynamic client/server selection for machine learning execution. In one embodiment, the system 100 includes one or more information handling devices 102, one or more ML apparatuses 104, one or more data networks 106, and one or more servers 108. In certain embodiments, even though a specific number of information handling devices 102, ML apparatuses 104, data networks 106, and servers 108 are depicted in FIG. 1, one of skill in the art will recognize, in light of this disclosure, that any number of information handling devices 102, ML apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In general, in one embodiment, the ML apparatus 104 is configured to receive a request at a first device, e.g., a client device to execute a machine learning workload for the client device, dynamically determine at least one characteristic of the client device that is related to execution of the machine learning workload, dynamically determine at least one characteristic of a second device, e.g., a server device that is related to execution of the machine learning workload, and select one of the client and server devices to execute the machine learning workload in response to the at least one characteristic of the selected one of the client and server devices being more suitable for execution of the machine learning workload than the other one of the client and server devices.

In this manner, the ML apparatus 104 dynamically selects either a client or a server to execute the machine learning processes based on a current state of the client and the server, and whether the current state of the client and the server meets the performance requirements of the machine learning processes such that the machine learning processes can be executed efficiently, e.g., in real-time or near real-time, as needed. The ML apparatus 104 is described in more detail below with reference to FIG. 2.

In certain embodiments, the ML apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the ML apparatus 104 may include a power interface, a wired and/or wireless network interface, a graphical interface that attaches to a display, and/or a semiconductor integrated circuit device as described below, configured to perform the functions described herein with regard to the ML apparatus 104.

The ML apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the ML apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the ML apparatus 104.

The semiconductor integrated circuit device or other hardware appliance of the ML apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the ML apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may be configured to execute or run machine learning algorithms, programs, applications, processes, and/or the like.

Figure 2:
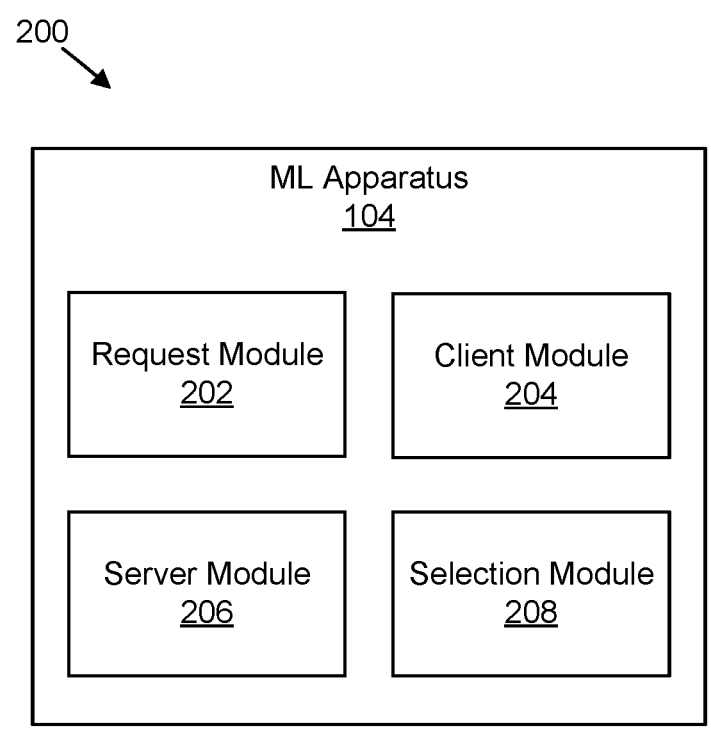
FIG. 2 is a schematic block diagram illustrating one embodiment of an apparatus for dynamic client/server selection for machine learning execution.

FIG. 2 is a schematic block diagram illustrating one embodiment of an apparatus 200 for dynamic client/server selection for machine learning execution. In one embodiment, the apparatus 200 includes an instance of a ML apparatus 104. In one embodiment, the ML apparatus 104 includes one or more of a request module 202, a client module 204, a server module 206, and a selection module 208, which are described in more detail below.

In one embodiment, the request module 202 is configured to receive a request at a first device, e.g., a client device to execute a machine learning workload for the client device. In certain embodiments, the client device is communicatively coupled to a server device, e.g., over a data network 106 connection, in a client-server type model. The client device may be an Internet of Things device such as a smart thermostat, switch, outlet, speaker, TV, light, kitchen appliance, and/or the like.

In such an embodiment, the request module 202 may receive a request to execute one or more machine learning processes, programs, applications, instructions, and/or the like for the client device, e.g., to forecast or estimate temperatures for a thermostat, to estimate usage schedules for various devices, to estimate power settings, to estimate resource usage, and/or the like.

As used herein, machine learning may refer to a device's or a system's ability to automatically learn and improve from experience without being explicitly programmed. Machine learning focuses on the development of computer programs that can access data and use it to learn for themselves. Various machine learning algorithms may be employed including supervised or unsupervised learning algorithms, neural networks, and/or other deep learning algorithms. The machine learning algorithms may utilize machine learning models that have been trained using training data for various purposes as it relates to the client device.

The request module 202 may receive a request as an instruction, as a function call, as a message, as a notification, as a signal, in response to a graphical user interface selection, in response to a program or application, and/or the like. The request module 202 may process the request, e.g., parse, analyze, or the like, to determine the type of machine learning that is needed to process the request, the type of data that is required to process the machine learning request, and/or the like.

In such an embodiment, the request module 202 may analyze the request to determine a condition of the machine learning workload that is necessary to process the request, e.g., a performance condition. The performance condition may include an amount of resources that are required to efficiently process the machine learning workload within a predefined amount of time, e.g., in real-time or near real-time, within X number of milliseconds, and/or the like. The resources may include a number of processors, a number of processor cycles, an amount of free memory, a storage requirement, network bandwidth usage, GPU processing usage, and/or the like.

The performance condition may be determined based on trends from previous or historical executions of the machine learning workload or similar machine learning workloads. The request module 202, for instance, may track, store, capture, or the like characteristics of machine learning workloads such as the amount of resources that are used to process the machine learning workload, how long it takes to achieve, determine, or calculate a results, and/or the like. The historical trend data may describe an estimated amount of computing resources used to execute the machine learning workload on the client device.

In one embodiment, the performance condition may include a determination of when the machine learning workload needs to be completed. For instance, if the machine learning workload execution request is in response to a user request, to a program request, and/or the like, and/or if the request includes a flag indicating the machine learning workload needs to be completed as soon as possible, that it is a high priority, and/or the like, which may indicate that the results of the machine learning workload execution are required or necessary to move forward with further processing on the client device, then the machine learning workload may need to be completed in real-time or near real-time or as soon as possible.

In one embodiment, the client module 204 is configured to dynamically (e.g., in real-time or near real-time, on the fly, without pre-calculation, or the like) determine at least one usage and/or performance characteristic of the client device that is related to execution of the machine learning workload. In one embodiment, the at least one usage and/or performance characteristic of the client device comprises a wait time for executing the machine learning workload on the client device. As used herein, the wait time may refer to the amount of time until the client device is ready to execute or process the machine learning workload. The wait time may be on the order of milliseconds, microseconds, seconds, and/or the like.

In such an embodiment, the client module 204 may query the client device for a list of currently executing processes, a priority of each of the currently executing processes, a current thread of execution, and/or the like to determine whether the machine learning workload can be executed now, whether other processes can be moved to a lower priority so that the machine learning workload can execute now, and/or the like, which may be necessary if the machine learning workload request indicates that the machine learning workload needs to be executed in real-time or near real-time.

In certain embodiments, the at least one usage and/or performance characteristic of the client device comprises at least one of a processor usage, a memory usage, and a remaining battery life of the client device. The client module 204 may continuously monitor the client device to track the current state of the device, e.g., the current processor usage, memory usage, battery life, and/or the like so that the information is available when a machine learning workload is requested to execute. The client device may be selected to execute the machine learning workload in response to one or more of the usage and/or performance characteristics of the client device satisfying at least one performance condition of the machine learning workload, as explained below.

For instance, the client module 204 may determine whether the processor usage, memory usage, battery life, and/or the like satisfy a threshold level that is necessary for executing the machine learning workload, based on the performance conditions, historical trends, and/or the like of the machine learning workload, and if so, may indicate that the client device is capable of executing the machine learning workload within the requested time frame. For example, if the machine learning workload will utilize 50% of the memory of the client device and 75% of the processor, and the client device is able to work within those thresholds based on its current resource usage state, the client module 204 may indicate that the client device is capable of executing the machine learning workload.

In one embodiment, the server module 206 is configured to dynamically (e.g., in real-time or near real-time, on the fly, without pre-calculation, or the like) determine at least one usage and/or performance characteristic of a second device, e.g., a server device that is related to execution of the machine learning workload. As explained above, the server may be communicatively coupled to the client device, e.g., over a local data network, over an Internet, and/or the like.

In one embodiment, similar to the client device, the at least one usage and/or performance characteristic of a server device includes a wait time for executing the machine learning workload on the server device. As used herein, the wait time for the server device may refer to the amount of time until the server device is ready to execute or process the machine learning workload. The wait time may be on the order of milliseconds, microseconds, seconds, and/or the like.

In one embodiment, the server module 206 may determine whether the server device is available for instant or real-time or near real-time execution of the machine learning workload, based on an analysis of the usage and/or performance characteristics of the server, e.g., the wait time, processor usage, memory usage, battery life (if applicable), and/or the like (similar to the client device), and whether the usage and/or performance characteristics satisfy a threshold for executing the machine learning workload.

In one embodiment, the server module 206 periodically (e.g., every second, every thirty seconds, and/or the like) polls, checks, queries, and/or the like a server device, multiple server devices, and/or the like from the client device to determine the usage and/or performance characteristics of the server devices, a current processing state of the server devices, a queue or wait time for the server devices, and/or the like.

In one embodiment, the selection module 208 is configured to select one of the client and server devices to execute the machine learning workload in response to the at least one usage and/or performance characteristic of the selected one of the client and server devices being more suitable for execution of the machine learning workload than the other one of the client and server devices.

A device may be more suitable for executing the machine learning workload than other devices, for instance, if the device can execute the machine learning workload within a requested time frame, e.g., in real-time, in near real-time, within five minutes, within twenty minutes, and/or the like; if the device has the correct machine learning algorithms, framework, architecture, and/or the like for executing the machine learning workload; if the device has usage and/or performance characteristics and/or available resources, e.g., available processing cycles, available memory, and/or the like, that satisfy or match the performance conditions of the machine learning workload; if executing the machine learning workload on the device will not have an impact on the performance of the device as it executes other applications or programs; and/or the like.

In certain embodiments, the selection module 208 selects the client device for executing the machine learning workload in response to the client device providing a result of executing the machine learning workload in real-time or near real-time (if the request is for receiving the machine learning workload results in real-time or near real-time), e.g., the client device is ready to process the machine learning workload as the request is received, e.g., without waiting a certain amount of time, and the client device has resources or usage and/or performance characteristics within the determined thresholds for executing the machine learning workload and return a result in real-time or near real-time.

In one embodiment, the selection module 208 selects a server device for executing the machine learning workload in response to the client device not being capable of returning a real-time or near real-time response, not having usage and/or performance characteristics that satisfy or match the performance conditions of the machine learning workload, and/or the like, and in response to the wait time for the server device being less than a requested time for receiving a response, e.g., the server device is capable of executing and returning a result of the machine learning workload in real-time or near real-time, has usage and/or performance characteristics that satisfy or match the performance conditions of the machine learning workload, and/or the like.

In one embodiment, in response to the client device not being selected to execute the machine learning workload, the server module 206 and/or the selection module 208 calculates a mean workload, e.g., a mean execution time, a mean resource usage, and/or the like, for the machine learning workload based on the historical trend data for the machine learning workload and based on the performance of a load balancer for each of a plurality of server devices. The load balancer may effectively distribute the load of the machine learning workload among the resources of a server, of multiple servers (e.g., in a distributed fashion, and/or the like). In such an embodiment, a server of the plurality of server devices selected to execute the machine learning workload in response the server being capable of handling the mean workload for the machine learning workload plus one to two standard deviations to cover a majority of the expected workloads.

In one embodiment, the selection module 208 selects a different server device that is communicatively coupled to the client device in response to one of the server devices having a wait time that exceeds the requested time for receiving a response and in response to the different server device being capable of returning a response within the requested time for receiving a response. The server module 206, as discussed above, may monitor the processing state of a plurality of potential servers that can execute the machine learning workload.

Accordingly, if the selection module 208 determines that one server is not in a state to execute the machine learning workload within the requested time frame and/or does not have the resources available to execute the machine learning workload, the selection module 208 may select a different server, may select multiple different servers (e.g., for distribution of the workload), and/or the like, for executing the machine learning workload.

If none of the client device and/or server devices can execute the machine learning workload within the requested time frame, e.g., in real-time or near real-time, the selection module 208 may select one of the client device and the server devices that has the lowest wait time for returning a response in response. In certain embodiments, the selection module 208 may distribute the machine learning workload among multiple devices such as the client device and/or a plurality of server devices to efficiently process the machine learning workload in a distributed fashion.

Figure 3:
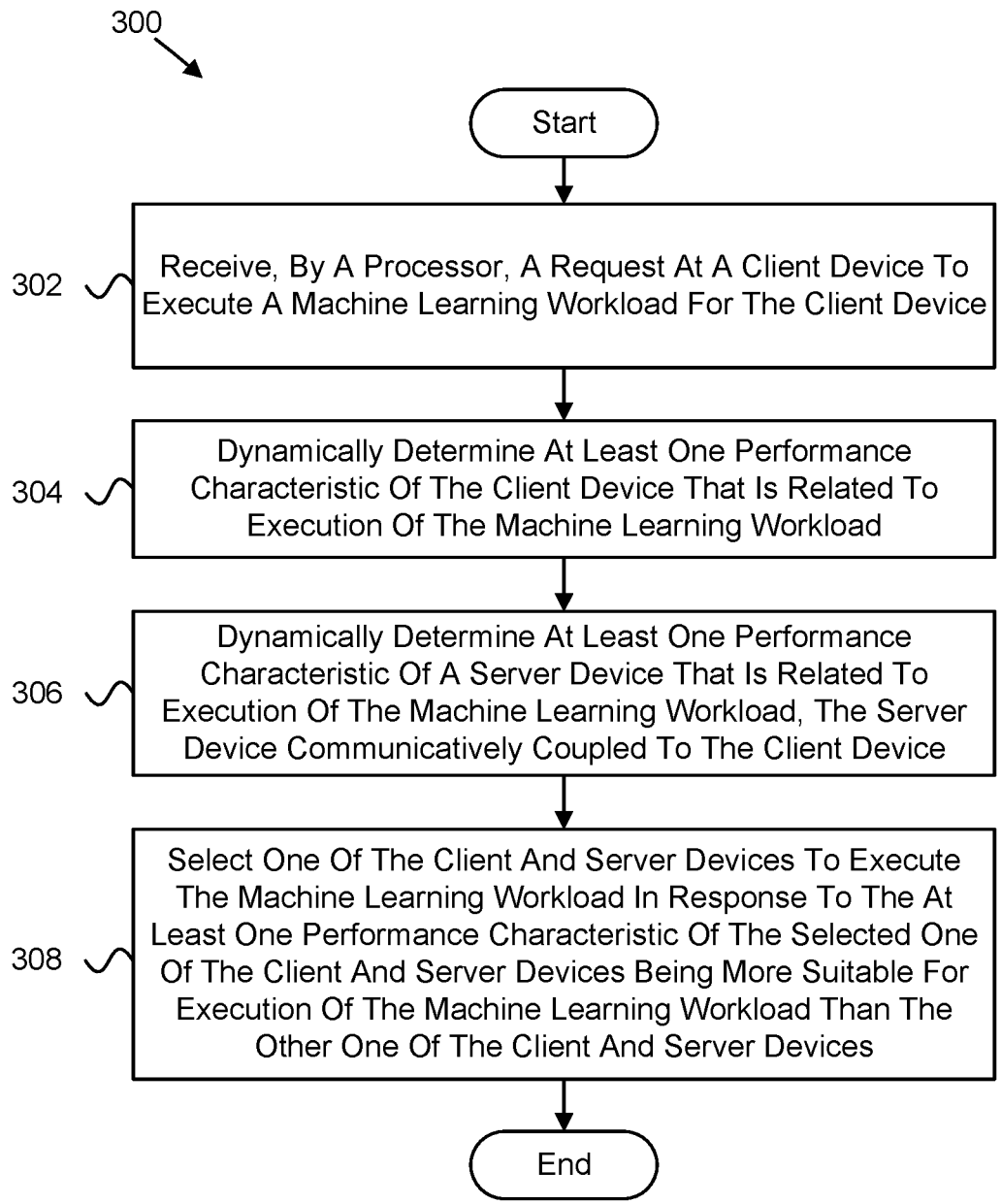
FIG. 3 is a schematic block diagram illustrating one embodiment of another apparatus for dynamic client/server selection for machine learning execution.

FIG. 3 is a schematic block diagram illustrating one embodiment of another apparatus 300 for dynamic client/server selection for machine learning execution. In one embodiment, the method 300 begins and receives 302 a request at a client device to execute a machine learning workload for the client device. In some embodiments, the method 300 dynamically determines 304 at least one usage and/or performance characteristic of the client device that is related to execution of the machine learning workload.

In one embodiment, the method 300 dynamically determines 306 at least one usage and/or performance characteristic of a server device that is related to execution of the machine learning workload. In further embodiments, the method 300 selects 308 one of the client and server devices to execute the machine learning workload in response to the at least one usage and/or performance characteristic of the selected one of the client and server devices being more suitable for execution of the machine learning workload than the other one of the client and server devices, and the method 300 ends. In various embodiments, the request module 202, the client module 204, the server module 206, and the selection module 208 perform the various steps of the method 300.

Figure 4:
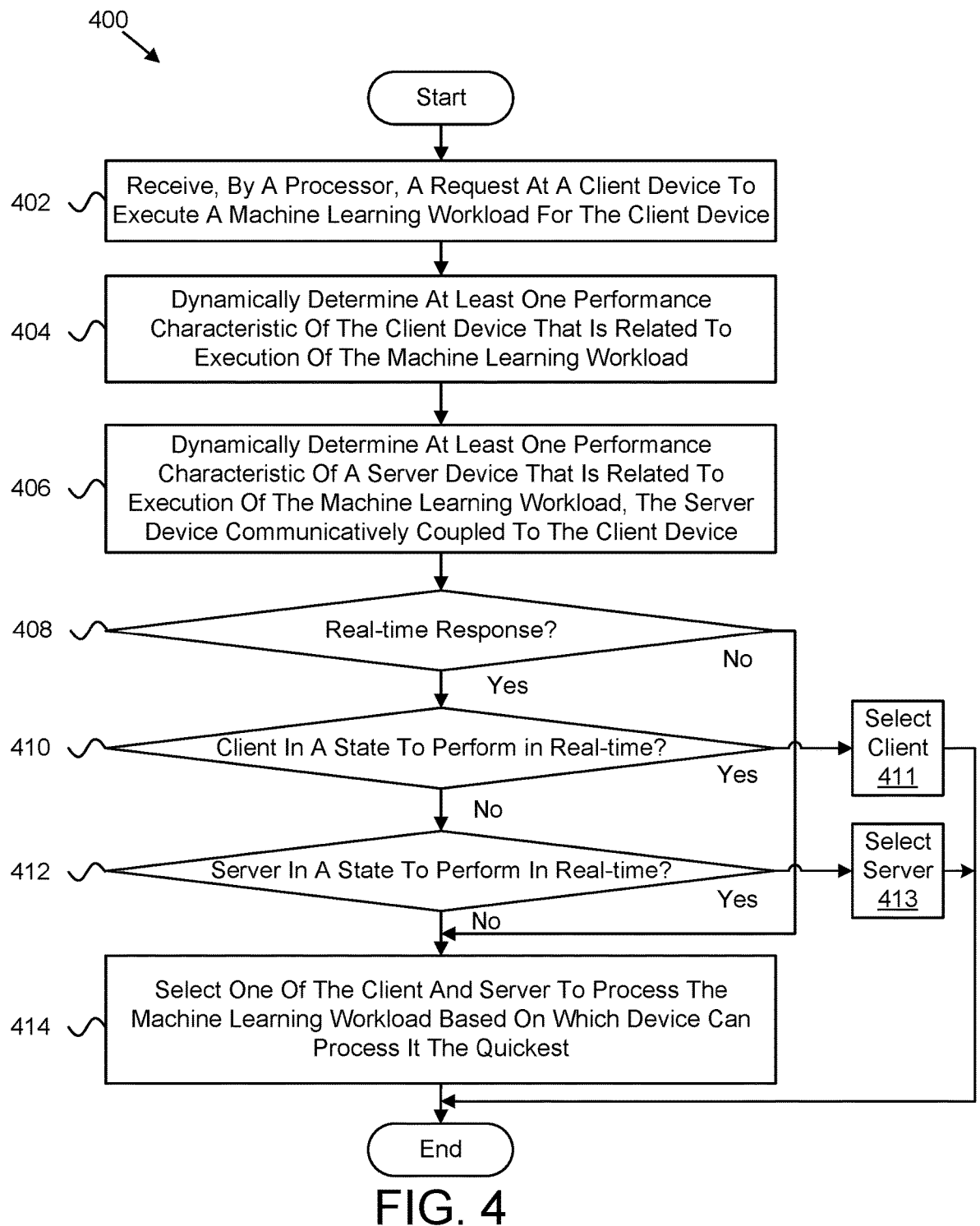
FIG. 4 is a schematic flow chart diagram illustrating one embodiment of a method for dynamic client/server selection for machine learning execution.

FIG. 4 is a schematic flow chart diagram illustrating one embodiment of a method 400 for dynamic client/server selection for machine learning execution. In one embodiment, the method 400 begins and receives 402 a request at a client device to execute a machine learning workload for the client device. In some embodiments, the method 400 dynamically determines 404 at least one usage and/or performance characteristic of the client device that is related to execution of the machine learning workload.

In one embodiment, the method 400 dynamically determines 406 at least one usage and/or performance characteristic of a server device that is related to execution of the machine learning workload. In one embodiment, if the method 400 determines 408 that the machine learning workload needs to be executed and results provided in real-time or near real-time, and if the method 400 determines 410 that the client device is in a state to process the machine learning workload in real-time or near real-time, e.g., the client device's processor usage, memory usage, battery life, and/or the like are within the thresholds for processing the machine learning workload, then the method 400 selects 411 the client device for executing the machine learning workload, and the method 400 ends.

Otherwise, if the method 400 determines 412 that the server device is in a state to process the machine learning workload in real-time or near real-time, e.g., the server device's processor usage, memory usage, battery life, and/or the like are within the thresholds for processing the machine learning workload, then the method 400 selects 413 the server device for executing the machine learning workload, and the method 400 ends.

Otherwise, if the method 400 determines 408 that the machine learning workload does not need to be performed in real-time or near real-time, e.g., the results are not necessarily needed right now or to continue processing on the client device, and/or the client device and the server device are not in a state to perform the machine learning workload in real-time or near real-time, if real-time or near real-time processing and results are needed, then the method 400 selects 414 one of the client and server devices to execute the machine learning workload based on which of the client and server devices can process the machine learning workload the quickest, and the method 400 ends. In various embodiments, the request module 202, the client module 204, the server module 206, and the selection module 208 perform the various steps of the method 400.

Figure 5:
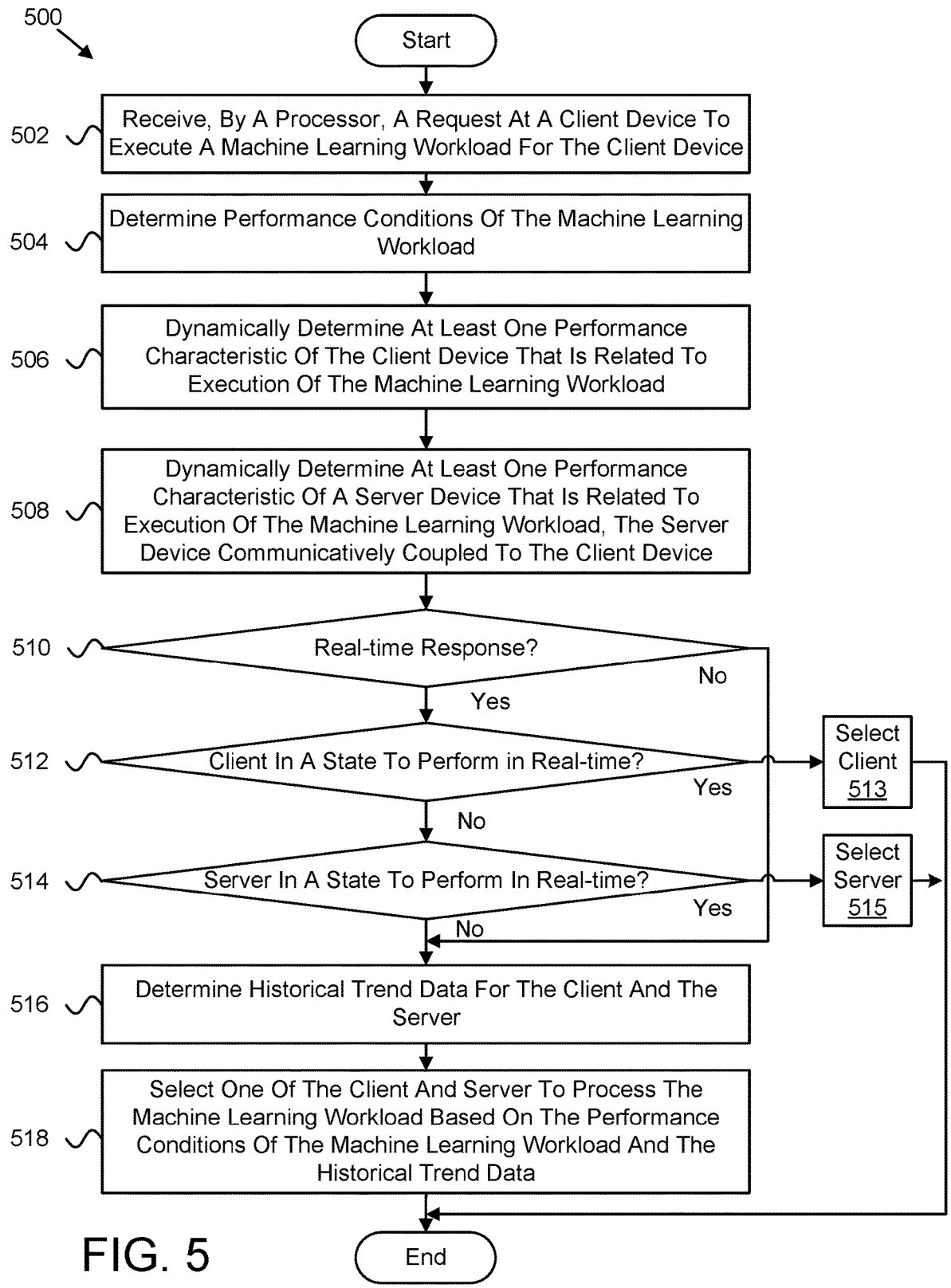
FIG. 5 is a schematic flow chart diagram illustrating one embodiment of another method for dynamic client/server selection for machine learning execution.

FIG. 5 is a schematic flow chart diagram illustrating one embodiment of a method 500 for dynamic client/server selection for machine learning execution. In one embodiment, the method 500 begins and receives 502 a request at a client device to execute a machine learning workload for the client device. In some embodiments, the method 500 determines 504 performance conditions of the machine learning workload, e.g., an amount of resources necessary to execute the machine learning workload based on previous executions of the machine learning workload and/or similar workloads.

In some embodiments, the method 500 dynamically determines 506 at least one usage and/or performance characteristic of the client device that is related to execution of the machine learning workload. In one embodiment, the method 500 dynamically determines 508 at least one usage and/or performance characteristic of a server device that is related to execution of the machine learning workload.

In one embodiment, if the method 500 determines 510 that the machine learning workload needs to be executed and results provided in real-time or near real-time, and if the method 500 determines 512 that the client device is in a state to process the machine learning workload in real-time or near real-time, e.g., the client device's processor usage, memory usage, battery life, and/or the like are within the thresholds that satisfy the performance conditions of the machine learning workload, then the method 500 selects 513 the client device for executing the machine learning workload, and the method 500 ends.

Otherwise, if the method 500 determines 514 that the server device is in a state to process the machine learning workload in real-time or near real-time, e.g., the server device's processor usage, memory usage, battery life, and/or the like are within the thresholds that satisfy the performance conditions of the machine learning workload, then the method 500 selects 515 the server device for executing the machine learning workload, and the method 500 ends.

Otherwise, if the method 500 determines 510 that the machine learning workload does not need to be performed in real-time or near real-time, e.g., the results are not necessarily needed right now or to continue processing on the client device, and/or the client device and the server device are not in a state to perform the machine learning workload in real-time or near real-time, if real-time or near real-time processing and results are needed, then the method 500 determines 516 historical trend data for the client and server devices that indicates, estimates, forecasts, describes, or the like a usage, utilization, or the like of the client and server devices based on previous or past usage of the client and server devices.

The method 500, in some embodiments, selects 518 one of the client and server devices to execute the machine learning workload based on which of the client and server devices can process the machine learning workload the quickest based on the performance conditions of the machine learning workload and the historical trend data for the client and server devices, and the method 500 ends. In various embodiments, the request module 202, the client module 204, the server module 206, and the selection module 208 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a processor; and
   a memory that stores code executable by the processor to:
   receive a request at a client device to execute a machine learning workload for the client device, the machine learning workload comprising a machine learning algorithm, wherein the client device uses results of execution of the machine learning workload;
   dynamically determine a wait time for executing the machine learning workload on the client device;
   dynamically determine a wait time for executing the machine learning workload on a server device, the server device communicatively coupled to the client device and providing computing services to the client device;
   select the client device in response to determining that the client device is able to provide a result of executing the machine learning workload in real-time;
   in response to determining that the client device is not able to provide the result of executing the machine learning workload in real-time, select one of the client device and the server device with a quickest execution time for execution of the machine learning workload based on the wait time of the client and server devices; and
   execute the machine learning workload using the selected client or server device.

2. The apparatus of claim 1, wherein the code is executable by the processor to select a different server device that is communicatively coupled to the client device in response to the server device having a wait time that exceeds a requested time for receiving a response and in response to the different server device being capable of returning a response within the requested time for receiving a response.

3. The apparatus of claim 2, wherein, in response to the different server device having a wait time that exceeds the requested time for receiving a response, the code is executable by the processor to select one of:
- the client device;
- the server device; and
- the different server device that has a lowest wait time for returning a response.

4. The apparatus of claim 1, wherein the wait time for execution of the machine learning workload is determined based on historical trend data for previous executions of the machine learning workload.

5. The apparatus of claim 4, wherein the historical trend data describes an estimated amount of computing resources used to execute the machine learning workload on the client device.

6. The apparatus of claim 4, wherein, in response to the client device not being selected to execute the machine learning workload, the code is executable by the processor to compute the wait time using a mean workload for the machine learning workload based on the historical trend data for the machine learning workload for each of a plurality of server devices and the client device, wherein selecting one of the client device and the server device with the quickest execution time to execute the machine learning workload comprises selecting one of the client device and a server device of the plurality of server devices to execute the machine learning workload in response to the selected server device or client device having a quickest execution time using the mean workload for the machine learning workload and being capable of handling the mean workload for the machine learning workload plus one standard deviation, the mean workload comprising one of a mean execution time and a mean resource usage.

7. The apparatus of claim 1, wherein the code is executable by the processor to periodically poll the server device for information related to the quickest execution time for execution of the machine learning workload by the server device.

8. The apparatus of claim 1, wherein the client device comprises an Internet of Things device.

9. A method, comprising:
- receiving a request at a client device to execute a machine learning workload for the client device, the client device comprising a processor, the machine learning workload comprising a machine learning algorithm, wherein the client device uses results of execution of the machine learning workload;
- dynamically determining a wait time for executing the machine learning workload on the client device;
- dynamically determining a wait time for executing the machine learning workload on a server device, the server device communicatively coupled to the client device and providing computing services to the client device;
- selecting the client device in response to determining that the client device is able to provide a result of executing the machine learning workload in real-time;
- in response to determining that the client device is not able to provide the result of executing the machine learning workload in real-time, selecting one of the client device and the server device with a quickest execution time for execution of the machine learning workload based on the wait time of the client and server devices; and
- executing the machine learning workload using the selected client or server device.

10. The method of claim 9, further comprising selecting a different server device that is communicatively coupled to the client device in response to the server device having a wait time that exceeds a requested time for receiving a response and in response to the different server device being capable of returning a response within the requested time for receiving a response.

11. The method of claim 10, further comprising, in response to the different server device having a wait time that exceeds the requested time for receiving a response, selecting one of:
- the client device;
- the server device; and
- the different server device that has a lowest wait time for returning a response.

12. The method of claim 9, wherein the wait time for execution of the machine learning workload is determined based on historical trend data for previous executions of the machine learning workload, the historical trend data describing an estimated amount of computing resources used to execute the machine learning workload on the client device.

13. The method of claim 12, in response to the client device not being selected to execute the machine learning workload, further comprising computing the wait time using a mean workload for the machine learning workload based on the historical trend data for the machine learning workload for each of a plurality of server devices and the client device, wherein selecting one of the client device and the server device with the quickest execution time to execute the machine learning workload comprises selecting one of the client device and a server device of the plurality of server devices to execute the machine learning workload in response to the selected server device or client device having a quickest execution time using the mean workload for the machine learning workload and being capable of handling the mean workload for the machine learning workload plus one standard deviation, the mean workload comprising one of a mean execution time and a mean resource usage.

14. A computer program product, comprising a non-transitory computer readable storage medium having program instructions embodied therewith, the program instructions executable by a processor to cause the processor to:
- receive a request at a client device to execute a machine learning workload for the client device, the machine learning workload comprising a machine learning algorithm, wherein the client device uses results of execution of the machine learning workload;
- dynamically determine a wait time for executing the machine learning workload on the client device;
- dynamically determine a wait time for executing the machine learning workload on a server device, the server device communicatively coupled to the client device and providing computing services to the client device;
- select the client device in response to determining that the client device is able to provide a result of executing the machine learning workload in real-time;
- in response to determining that the client device is not able to provide the result of executing the machine learning workload in real-time, select one of the client device and the server device with a quickest execution time for execution of the machine learning workload based on the wait time of the client and server devices; and
- execute the machine learning workload using the selected client or server device.

* * * * *